June 29, 1954 C. J. W. CLASEN 2,682,397
SNUBBED SPRING GROUP
Filed Sept. 15, 1950 2 Sheets-Sheet 1
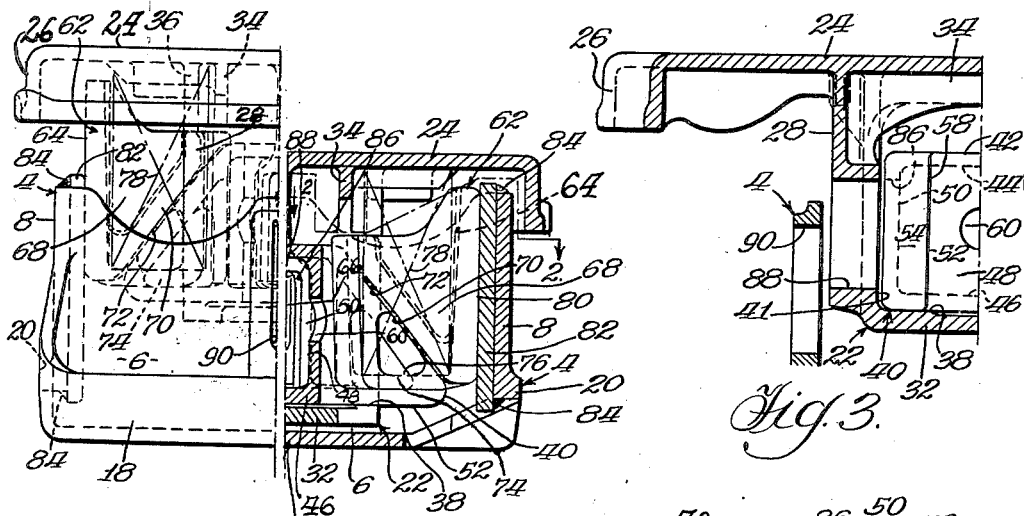
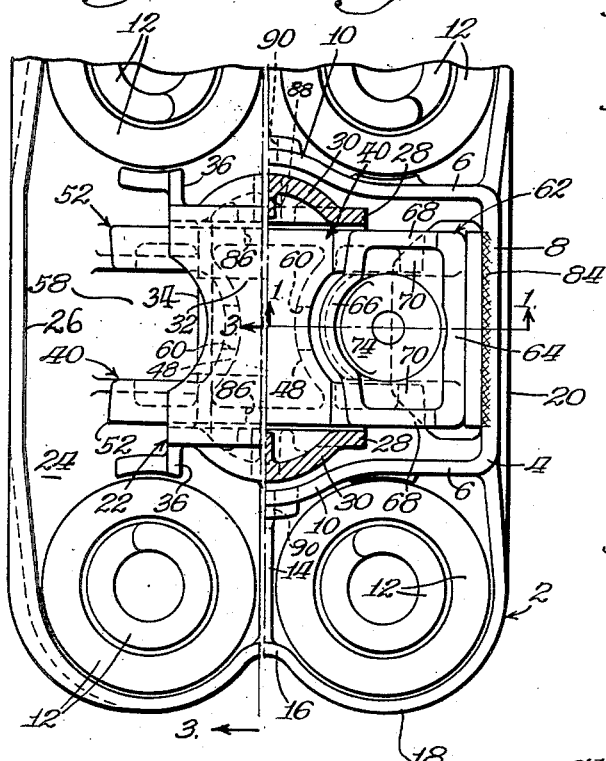
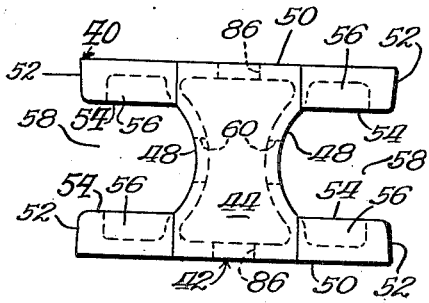
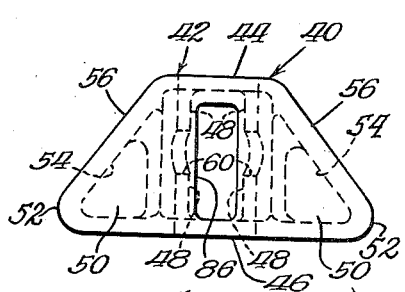
INVENTOR.
Claus J. Werner Clasen
BY
Atty.

June 29, 1954
C. J. W. CLASEN
2,682,397
SNUBBED SPRING GROUP
Filed Sept. 15, 1950
2 Sheets-Sheet 2
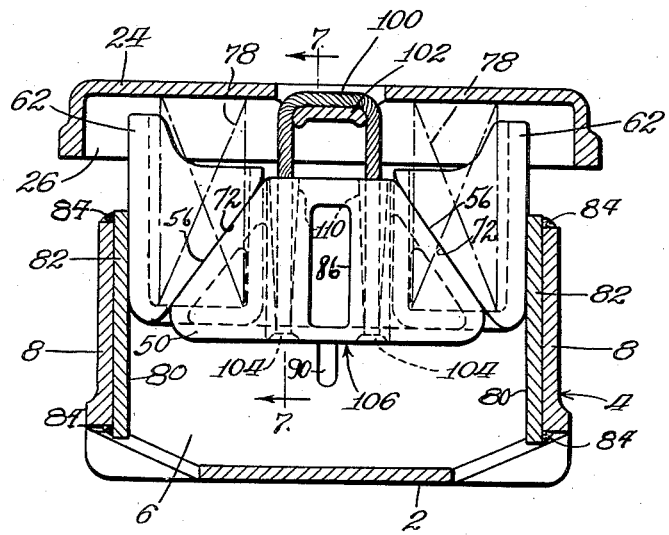
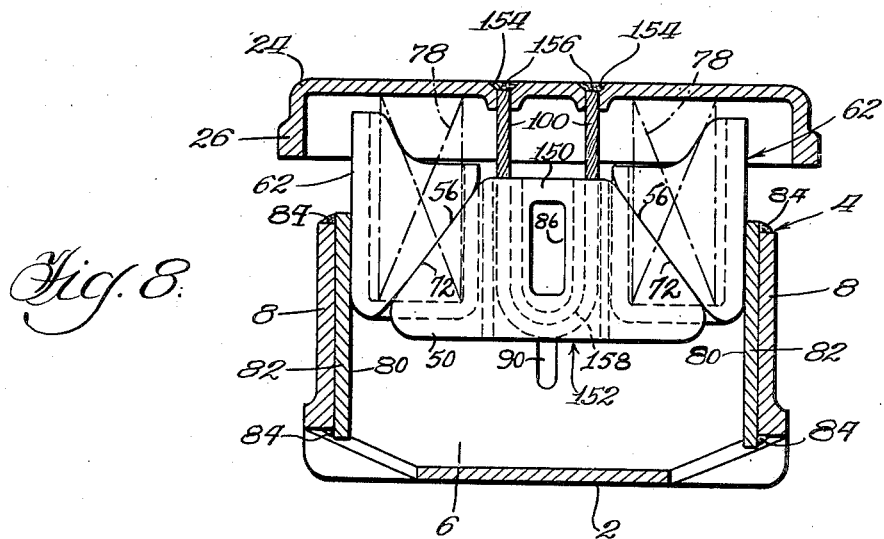
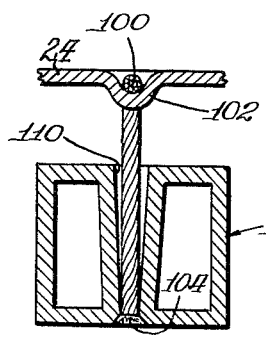
INVENTOR.
Claus J. Werner Clasen
BY
Atty.

Patented June 29, 1954

2,682,397

UNITED STATES PATENT OFFICE 2,682,397

SNUBBED SPRING GROUP

Claus J. Werner Clasen, Chicago, Ill., assignor to American Steel Foundries, Chicago, Ill., a corporation of New Jersey Application September 15, 1950, Serial No. 185,001

17 Claims. (Cl. 267—9)

This invention relates to a package spring group and more particularly to a type especially suitable for railway use and comprising spaced plates with a friction device therebetween.

Devices in this category are normally used between the side frame and a truck bolster in railway trucks in which the bolster is guided for vertical movement with respect to the side frame. For manufacturing and operational reasons a relatively loose fit is provided for the vertical movement which becomes looser as wear of the parts takes place.

This looseness in turn permits a certain amount of horizontal movement of the bolster in respect to the side frames and as heavy loads are carried upon the bolster, horizontal forces such as are caused by a sudden application of air brakes, the gathering of slack between cars or the coupling together of cars and many other conditions, produce heavy impacts horizontally that cause the bolster to move within the limits of looseness between the bolster and frames.

Heretofore it has been customary to construct friction devices for spring damping wherein one of its elements moves with the bolster and another element is held stationary with respect to the frame. One of these elements is provided with a rigid carrier upon which friction wedges are mounted to bear against vertical friction surfaces provided on the other element. Thus a stiff metallic connection is set up between the two elements through which all horizontal shocks are transmitted from one element to the other, thereby causing failure of the parts. Strengthening the parts by increasing the thickness of various sections is not feasible in view of the limited space available.

The principal object of the invention is to provide a novel friction device wherein the parts are so arranged as to provide the necessary flexibility to accommodate various movements between the plates without breaking the friction device.

A further object of the invention is to provide such a friction device wherein the parts frictionally resist relative movements between the spaced plates and wherein the parts are arranged to shift transversely of the device with the movements between the plates thus eliminating excessive stressing of the friction device and its connections with the plates.

A further object of the invention is to provide a friction device comprising followers integrally united with the spaced plates of the spring group, the side walls of the followers being of special cross section to provide exceptional strength and an extensive area of connection with the associated plate.

The invention contemplates the provision of a friction device including a plurality of shoes and means for flexibly supporting the shoes from one of the plates of the spring group.

A further object of the invention is to provide a friction arrangement wherein the pressures on the friction shoes, which are actuated by independent springs, are substantially equalized.

These and other objects of the invention will become more apparent from the specification and the drawings wherein:

Figure 1 is an end view of the left half of one embodiment of a spring group with the load coils removed;

Figure 1a is a section of the right half of the spring group shown in Fig. 1, taken substantially on the line 1—1 of Figure 2 with the shoe shown in side elevation;

Figure 2 is a bottom plan view of the top plate and friction assembly, with the friction shoe removed, of the left half of the spring group;

Figure 2a is a sectional view taken substantially in the planes indicated by the line 2—2 of Figure 1. It will be understood that the construction of the top and bottom plates is the same at opposite ends.

Figure 3 is a fragmentary sectional view taken substantially on the line 3—3 of Figure 2 with the equalizer wedge shown in end view;

Figure 4 is a top plan view of the equalizer wedge;

Figure 5 is a side elevational view thereof;

Figure 6 is a transverse sectional view of another form of a spring group, the friction assembly being shown in side elevation;

Figure 7 is a fragmentary sectional view taken substantially in the plane indicated by the line 7—7 of Figure 6 with the equalizer wedge shown in end elevation, and Figure 8 is a view similar to Figure 6 and illustrating another form of the invention.

Describing the invention in detail and referring first to the embodiment shown in Figures 1 to 5, the spring group comprises a bottom plate 2 formed centrally thereof with a friction casing, generally indicated 4, said casing comprising spaced side walls 6, 6, and spaced end walls 8, 8, interconnecting the ends of the side walls 6, 6. The side walls are curved or bowed at their central portions 10, 10 (Figure 2) away from each other and extend between adjacent sets of load-carrying springs 12, 12. The springs 12, 12 are positioned at the four corners of the spring group and are arranged two sets at each end of the group with the casing 4 therebetween. It will be seen that the bowed portions 10, 10 afford convenient positioning means for the lower portions of the adjacent sets of springs. Each portion 10 is connected on its outer side to the inner end of a generally vertical rib 14, the rib being integral with the top side of the bottom plate and merging at its other end into an inwardly curved portion 16 (Figure 2), which extends between adjacent sets of springs, of a peripheral upstanding flange 18 on the bottom plate, the flange 18 being contoured to surround the lower ends of the springs 12, 12. The flange 18 merges with opposite ends of the casing 4 and in its areas of merger is reinforced by ribs 20 which are formed integral with the lower edges of end walls 8.

The casing or bottom follower 8 receives a top follower or carrier 22 therein (Figures 2 and 3). The carrier 22 is formed integral with a top plate 24, the top plate seating at the four corners thereof on the upper ends of the load-carrying sets of springs 12, 12. The top plate is provided with a depending peripheral flange 26 contoured to surround the upper ends of the sets of springs 12, 12 to afford convenient positioning means therefor.

The carrier 22 comprises spaced side walls 28, 28 disposed adjacent to walls 10, 10 of the casing 4. It will be noted that the walls 28, 28 comprise central substantially semi-cylindrical portions 30, each portion 30 being arranged substantially concentric with the adjacent portion 10. The upper ends of the walls 28, 28 are formed integral with the underside of the top plate 24. By bowing the portions 30, 30 and 10, 10 outwardly, the strength of these walls is materially increased and the area of connection with the respective plates is also greatly increased. The lower ends of the walls 28, 28 are interconnected by a substantially horizontal wall 32. The upper portions of the walls 28, 28 are interconnected at their lateral edges by substantially vertical webs 34, 34, the upper edges of the webs 34 being formed integral with the bottom side of the top plate 24. The walls 28, 28 are connected on their remote sides along the upper ends of their lateral edges with bosses 36, 36, formed integral with the top plate and each having an extension projecting partially around the associated set of springs 12. The bosses 36 also improve the connection of the side walls 30, 30 with the top plate.

The bottom wall 32 of the carrier provides on its top side a bearing or friction area 38 adjacent each wall 28 which slidably supports an equalizer wedge, generally indicated 40. The wedge or member 40 extends through a pocket 41 (Figure 3) of the carrier between walls 28, 28 and seats on its bottom side against the surfaces 38.

The member 40 comprises a central body portion 42, said body portion having spaced substantially horizontal top and bottom walls 44 and 46 interconnected adjacent opposite ends of member 40 by substantially vertical inwardly bowed walls 48, 48 intermediate the ends of the member 40. The walls 44 and 46 are interconnected at opposite sides of member 40 by substantially vertical side walls 50, 50, the walls 50, 50 merging intermediate their ends with the lateral edges of walls 48, 48 and extending at opposite ends outwardly of the body portion 42 to form ledges 52, 52 at opposite ends of the equalizer wedge 42. It will be seen that the adjacent ledges 52, 52 are spaced transversely of member 40 and are formed on their top sides with inturned flanges 54, 54 sloping downwardly from wall 44 to the adjacent end of member 40 to provide wedge surfaces 56, 56 on the top sides thereof. Adjacent ledges 52, 52 and wall 48 form a pocket 58 open through the adjacent end of member 40 and through the top and bottom thereof. It will be seen that the bottom wall 46 of the member 40 is bifurcated at opposite ends and is continued at each end to form the bottom side of the adjacent ledge 52. The walls 48, 48 are cored away with opening 60, 60 to lighten the structure and permit good foundry practice.

A friction shoe 62 is positioned within each pocket. Each shoe is a skeletal cuplike structure and comprises spaced front and rear walls 64 and 66 interconnected at their side edges by side walls 68, 68, the lower edges of the side walls being formed with inturned flanges to provide ledges 70, 70 with wedge surfaces 72 on the bottom sides sloping downwardly toward wall 64 and engaging the related surfaces 56, 56 on the ledges 52, 52 therebelow. The lower ends of the front and rear walls are interconnected by a bottom wall 74, which provides a spring seat on its top side at 76 (Figure 1) for the lower end of a compression spring 78 which extends into the shoe, the upper end of spring 78 seating against the underside of the top plate 24. It will be seen that the rear wall 66 is curved rearwardly to accommodate the spring 78, the curvature being substantially concentric with the curvature of the adjacent wall 48 of member 40. Each spring 78 urges its related shoe downwardly against the equalizer wedge 40, whereby the latter is urged against the wall 32. The shoe 62, 62 at opposite ends of the equalizer wedge are caused to slide downwardly outwardly, whereupon the front wall 64 of each shoe engages along a preferably vertical friction face 80 on an adjacent friction plate 82 which is mounted on the adjacent end wall in any convenient manner as by welding at 84, 84.

The arrangement described may be broadly considered as a three wedge unit which is designed to balance its load between the opposed surfaces of the casing. The spread apart arrangement of the two springs at opposite ends of the unit in conjunction with the floating action of the unit and the vibrations inherent in railway trucks tends to shift the unit so as to equalize the pressure of the two springs. Furthermore, the floating action of the unit maintains the shoes at opposite ends at approximately the same level whereas in the rigid construction lateral movement between the plates causes the shoes to move up and down and not without misaligning the parts or shifting the top or bottom plates.

The construction affords a further decided advantage in that various relative movements between the top and bottom plates are accommodated without imposing high stresses on the carrier because of the slidable action and relative movement between the carrier and the wedge equalizer 40.

Referring now to the embodiment shown in Figures 6 and 7, wherein parts identical with those in the previous modification are identified by corresponding reference numerals, it will be seen that the top follower or carrier in the present construction comprises a flexible carrier member 100 which is in the form of a cable preferably made of steel. The cable has its central portion extended over a loop 102 formed centrally and depressed below the top plate 24.

The opposite ends of the cable 100 extend downwardly from the loop, and the lower extremities of the cable are connected as at 104, 104 to the bottom of a carrier 106 which is substantially the same as carrier 40. The carrier 106 may of course be a solid body of metal with vertical openings 110, 110 therethrough, through which the opposite ends of the cable 100 may extend. The openings 110, 110 may be of conical form and taper downwardly in order to permit maximum relative movement or pendulous action between the carrier 106 and the cable 100 without binding.

The opposite ends of the carrier 106 comprise the ledges 52, 52 which have wedging engagement with shoes 62, 62, the shoes being actuated by the springs 78 into wedge engagement with the member 106 and in friction engagement with the plates 82 on the end walls of the casing 4. It will be readily seen that an equalizing arrangement similar to the previous embodiment is afforded and at the same time a flexible connection between the top plate and the friction assembly is provided.

In Figure 8 a further modification is shown wherein parts identical with those in the previous embodiments are identified with the same reference numerals. In the present embodiment a top follower or carrier cable 100 is looped under a central portion or body 150 of a wedge equalizer 152 which is substantially similar to the members 106 and 40. In the present embodiment the top plate is provided with openings 154, 154 into which the upper ends of the cable 100 extend, said ends being connected in any convenient manner to the top plate as by welding at 156. The shoes 62, 62 are actuated by the springs 78 similarly as in the previous embodiments.

In the embodiments of Figures 6 and 7 the cable is slidable on the loop 102 and in Figure 8 the member 152 is slidable on its U-shaped wall 158 on the cable 100. This feature permits adjustment of the wedge for effective cooperation with the shoes.

It will be readily understood that all of the embodiments described will obviate the disadvantages heretofore enumerated and will provide an effective control for various movements. At the same time, the parts will automatically position themselves in the best working advantage, and any tendency of misalignment is positively precluded. In each case the wedge equalizer is urged against the bottom extremity of the carrier.

In each embodiment the side walls 50, 50 of each equalizer wedge are formed with aligned vertically elongated slots 86, 86 alignable with similar slots 90, 90 in portions 10, 10 and in Figures 1 to 5 with slots 88, 88 in the portions 30, 30 for reception of retainer bar therethrough (not shown) to hold the parts in assembly and permit easy handling.

I claim:

1. In a friction device, telescoping followers, spaced friction surfaces on one follower, a friction assembly carried by the other follower between said surfaces, said assembly including an equalizer wedge member supported at the inner end of said other follower and movable transversely of said surfaces, a shoe wedged between each surface and adjacent portion of said member, and independent spring means compressed between each shoe and said other follower, movement of said member being effective to substantially equalize the forces of said spring means against the shoes.

2. A friction device, according to claim 1, wherein said other follower comprises an inner end wall and said member is slidable against said wall transversely of said device.

3. A friction device, according to claim 1, wherein said other follower is at the upper end of the device and comprises a bottom wall and said member is urged downwardly by said spring means through said shoes into frictional engagement with said bottom wall.

4. A friction device, according to claim 1, wherein said other follower comprises a flexible element supporting said member for pendulous movement between said surfaces.

5. A spring group for a railway car truck comprising top and bottom plates, load carrying springs therebetween, a friction casing formed integral with the top side of the bottom plate and presenting spaced friction surfaces, a carrier depending from said top plate into said casing, an equalizer wedge member movably supported at the bottom of said carrier for movement transaxially of said casing, said member having downwardly sloping wedge surfaces at opposite ends, a shoe at each end of said member wedged between adjacent surfaces on said member and said casing, and independent spring means compressed between each shoe and said top plate for urging the shoe into the wedged position thereof and holding said member away from the top plate, said member being movable between said shoes to substantially equalize the pressures exerted on the shoes by respective spring means.

6. A spring group, according to claim 5, wherein said carrier comprises side walls connected at their upper edges to the top plate and bowed away from each other to increase the rigidity of the walls and obtain a large area of connection with the top plate, a bottom wall interconnecting the lower edges of the side walls, and wherein said member extends between said side walls and seats on said bottom wall and projects at opposite ends from opposite sides of said carrier.

7. A spring group, according to claim 5, wherein said member is a skeletal structure comprising spaced top and bottom walls interconnected at opposite edges by spaced side walls, transverse walls interconnecting the side walls and the top and bottom walls, said side walls extending outwardly of the transverse walls and forming spaced ledges at opposite ends of said member.

8. A spring group, according to claim 5, wherein said carrier comprises a metallic cable, a loop depending from the top plate and receiving the cable therethrough, said cable being connected at its lower ends to said member at points spaced longitudinally of said member.

9. A spring group, according to claim 8, wherein said points are located at the bottom of said member and the cable passes through upwardly flaring openings in said member.

10. A spring group, according to claim 5, wherein said carrier comprises a cable looped under said member and having its upper ends connected to the top plate.

11. In a spring group, spaced top and bottom plates and at least one load spring confined therebetween, a friction casing on one plate, a carrier assembly on the other plate extending into the casing, said assembly including an equalizer wedge supported by and movable relative to the other plate and presenting wedge surfaces at its ends facing said other plate, shoes wedged between said surfaces and said casing, independent spring means reacting between said other plate and each of said shoes urging the latter to the wedged position thereof, said equalizer wedge being movable between said shoes without moving said other plate to substantially equalize the action of said resilient means against their related shoes.

12. In a spring group, spaced plates, resilient means confined therebetween, a casing on one plate, a carrier on the other plate, an equalizer wedge member movably mounted on the end of said carrier remote from said other plate and extending into the casing, a shoe wedged between each end of said member and said casing, and independent spring means substantially parallel to said resilient means and compressed between each shoe and said other plate, said member being movable between said shoes to substantially equalize the action of said spring means against their respective shoes.

13. In a friction device, telescoping followers, one presenting friction surfaces, an equalizer wedge, the other follower comprising a carrier movably supporting said equalizer wedge, friction shoes wedged between opposite areas of the equalizer wedge and said surfaces, and independent resilient means compressed between each shoe and said other follower, said means being operative to wedge said shoes between said equalizer wedge and said surfaces, said equalizer wedge being shiftable between the shoes to substantially equalize the pressure of said resilient means against their related shoes.

14. A spring group, according to claim 12, in which said carrier is formed centrally on the inner side of said other plate, said carrier comprising spaced side walls extending transversely of said other plate, said walls being arranged side by side and having intermediate portions bowed longitudinally thereof away from each other, and a wall interconnecting the edges of said walls remote from said other plate.

15. A spring group, according to claim 11, in which said carrier assembly includes a cable connected to said equalizer wedge and having a slidable connection to said other plate.

16. A spring group, according to claim 11, in which said carrier assembly includes a cable connected to said other plate and slidably engaged to said equalizer wedge, said cable holding said wedge against movement away from said other plate.

17. A spring group, according to claim 11, in which said carrier assembly includes a cable connected to said other plate and slidably engaged to said equalizer wedge, said cable holding said wedge against movement away from said other plate, said cable passing around a side of said wedge, and said wedge having a U-shape wall bearing against said cable.

References Cited in the file of this patent

UNITED STATES PATENTS

| Number | Name | Date |
|---|---|---|
| 1,809,908 | Olander | June 16, 1931 |
| 2,059,503 | Webb | Nov. 3, 1936 |
| 2,118,006 | Couch | May 17, 1938 |
| 2,155,451 | Sproul | Apr. 25, 1939 |
| 2,479,863 | Pierce | Aug. 23, 1949 |
| 2,483,172 | Bachman | Sept. 27, 1949 |
| 2,483,181 | Clasen | Sept. 27, 1949 |